US006556402B2

(12) United States Patent
Kizis et al.

(10) Patent No.: US 6,556,402 B2
(45) Date of Patent: Apr. 29, 2003

(54) DEVICE AND METHOD FOR MOUNTING AN OVERVOLTAGE PROTECTION MODULE ON A MOUNTING RAIL

(75) Inventors: John Anthony Kizis, Willow Springs, NC (US); Jonathan Conrad Cornelius, Fuquay-Varina, NC (US); Robert Michael Ballance, Raleigh, NC (US)

(73) Assignee: Raycap Corporation, Athens (GR)

( * ) Notice: Subject to any disclaimer, the term of this patent is extended or adjusted under 35 U.S.C. 154(b) by 0 days.

(21) Appl. No.: 09/886,295

(22) Filed: Jun. 21, 2001

(65) Prior Publication Data

US 2002/0196593 A1 Dec. 26, 2002

(51) Int. Cl.[7] .................................................. H02H 3/20
(52) U.S. Cl. ...................................................... 361/91.1
(58) Field of Search ................................ 361/91.1, 728, 361/760, 807, 809, 810; 439/620, 621, 622

(56) References Cited

U.S. PATENT DOCUMENTS

| | | | | |
|---|---|---|---|---|
| 4,388,665 A | | 6/1983 | Pütz | |
| 5,515,436 A | * | 5/1996 | Bonvallat | |
| 5,519,564 A | | 5/1996 | Carpenter, Jr. | 361/127 |
| 5,721,664 A | | 2/1998 | Uken et al. | 361/125 |
| 6,038,119 A | | 3/2000 | Atkins et al. | 361/127 |

FOREIGN PATENT DOCUMENTS

| | | |
|---|---|---|
| DE | 29 12 076 A1 | 10/1980 |
| EP | 0 364 745 A2 | 9/1989 |
| SI | 9800018 A | 8/1999 |

OTHER PUBLICATIONS

Siemens Matshushita Components, pp. 15–174. Undated.

International Search Report, PCT/US02/17947, Dec. 11, 2002.

* cited by examiner

*Primary Examiner*—Edward H. Tso
(74) *Attorney, Agent, or Firm*—Myers Bigel Sibley & Sajovec

(57) ABSTRACT

An overvoltage protection assembly includes a rail and a mount device. The mount device includes a base member having front and rear opposed surfaces and a mounting structure on the rear surface. The mounting structure secures the base member to the rail. An overvoltage protection module is mounted on the front surface of the base member.

34 Claims, 10 Drawing Sheets

DEVICE AND METHOD FOR MOUNTING AN OVERVOLTAGE PROTECTION MODULE ON A MOUNTING RAIL

FIELD OF THE INVENTION

The present invention relates to voltage surge protection devices and, more particularly, to means and methods for mounting an overvoltage protection module.

BACKGROUND OF THE INVENTION

Frequently, excessive voltage is applied across service lines that deliver power to residences and commercial and institutional facilities. Such excess voltage or voltage spikes may result from lightning strikes, for example. The voltage surges are of particular concern in telecommunications distribution centers, hospitals and other facilities where equipment damage caused by voltage surges and resulting down time may be very costly.

Typically, one or more varistors (i.e., voltage dependent resistors) are used to protect a facility from voltage surges. Generally, the varistor is connected directly across an AC input and in parallel with the protected circuit. The varistor has a characteristic clamping voltage such that, responsive to a voltage increase beyond a prescribed voltage, the varistor forms a low resistance shunt path for the overvoltage current that reduces the potential for damage to the sensitive components. Typically, a line fuse may be provided in the protective circuit and this line fuse may be blown or weakened by the essentially short circuit created by the shunt path.

Varistors have been constructed according to several designs for different applications. For heavy-duty applications (e.g., surge current capability in the range of from about 60 to 100 kA) such as protection of telecommunications facilities, block varistors are commonly employed. A block varistor typically includes a disk-shaped varistor element potted in a plastic housing. The varistor disk may be formed by pressure casting a metal oxide material, such as zinc oxide, or other suitable material such as silicon carbide. Copper, or other electrically conductive material, may be flame sprayed onto the opposed surfaces of the disk. Ring-shaped electrodes are bonded to the coated opposed surfaces and the disk and electrode assembly is enclosed within the plastic housing. Examples of such block varistors include Product No. SIOV-B860K250 available from Siemens Matsushita Components GmbH & Co. KG and Product No. V271BA60 available from Harris Corporation.

Another varistor design includes a high-energy varistor disk housed in a disk diode case. The diode case has opposed electrode plates and the varistor disk is positioned therebetween. One or both of the electrodes include a spring member disposed between the electrode plate and the varistor disk to hold the varistor disk in place. The spring member or members provide only a relatively small area of contact with the varistor disk.

The varistor constructions described above often perform inadequately in service. Often, the varistors overheat and catch fire. Overheating may cause the electrodes to separate from the varistor disk, causing arcing and further fire hazard. There may be a tendency for pinholing of the varistor disk to occur, in turn causing the varistor to perform outside of its specified range. During high current impulses, varistor disks of the prior art may crack due to piezoelectric effect, thereby degrading performance. Failure of such varistors has led to new governmental regulations for minimum performance specifications. Manufacturers of varistors have found these new regulations difficult to meet.

U.S. Pat. No. 6,038,119 to Atkins et al., the disclosure of which is hereby incorporated herein by reference in its entirety, discloses overvoltage protection modules including wafers of varistor material. The overvoltage protection modules described therein may address the problems described above.

Overvoltage protection devices, circuit breakers, fuses, ground connections and the like are often mounted on DIN (Deutsches Institut für Normung e.V.) rails. DIN rails may serve as mounting brackets of standardized dimensions so that such electrical control devices may be sized and configured to be readily and securely mounted to a support surface such as an electrical service utility box.

SUMMARY OF THE INVENTION

According to embodiments of the present invention, an overvoltage protection assembly includes a rail and a mount device. The mount device includes a base member having front and rear opposed surfaces and a mounting structure on the rear surface. The mounting structure secures the base member to the rail. An overvoltage protection module is mounted on the front surface of the base member.

According to further embodiments of the present invention, an overvoltage protection assembly for mounting on a rail includes a mount device. The mount device includes a base member having front and rear opposed surfaces and a mounting structure on the rear surface. The mounting structure is adapted to secure the base member to the rail. An overvoltage protection module is mounted on the front surface of the base member.

According to further embodiments of the present invention, a mount device for mounting an overvoltage protection module on a rail includes a base member having front and rear opposed surfaces and a mounting structure on the rear surface. The mounting structure is adapted to secure the base member to the rail. The base member is adapted to securely engage the overvoltage protection module. The base member is formed of metal.

According to further embodiments of the present invention, a mount assembly for mounting an overvoltage protection module on a support includes a rail and a mount device. The mount device includes a base member having front and rear opposed surfaces and a mounting structure on the rear surface. The mounting structure secures the base member to the rail. The base member is adapted to securely engage the overvoltage protection module. The base member is formed of metal.

According to method embodiments of the present invention, a method of mounting an overvoltage protection module on a rail includes providing a mount device including a base member having front and rear opposed surfaces and a mounting structure on the rear surface. The base member is secured to the rail using the mounting structure. An overvoltage protection module is mounted on the front surface of the base member.

Objects of the present invention will be appreciated by those of ordinary skill in the art from a reading of the figures and the detailed description of the preferred embodiments which follow, such description being merely illustrative of the present invention.

BRIEF DESCRIPTION OF THE DRAWINGS

The accompanying drawings which form a part of the specification, illustrate key embodiments of the present invention. The drawings and description together serve to fully explain the invention. In the drawings.

DETAILED DESCRIPTION OF THE PREFERRED EMBODIMENTS

Figure 1:
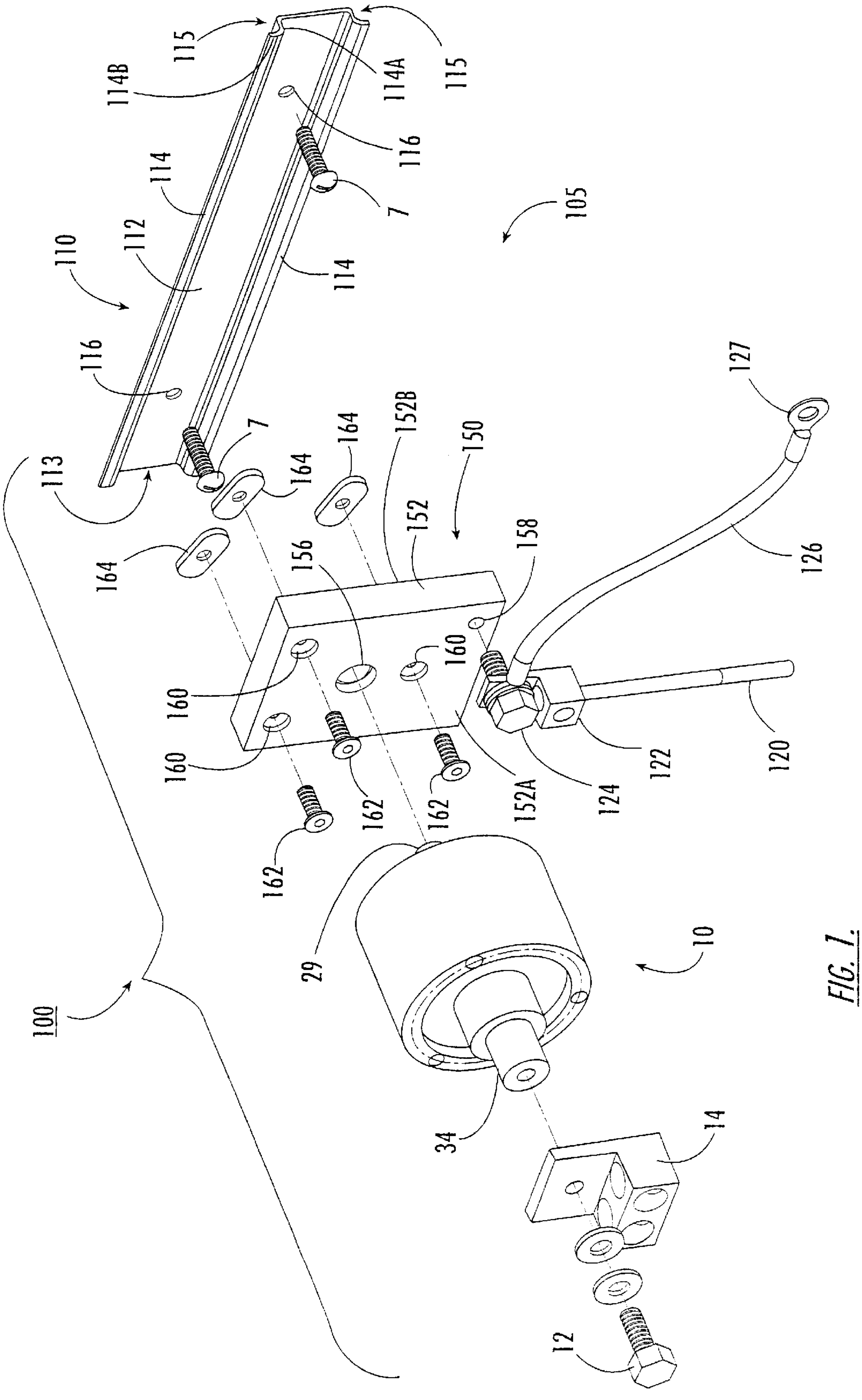
FIG. 1 is an exploded, perspective view of an overvoltage protection assembly according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout. The terms "upwardly", "downwardly", "vertical", "horizontal" and the like are used herein for the purpose of explanation only.

Figure 2:
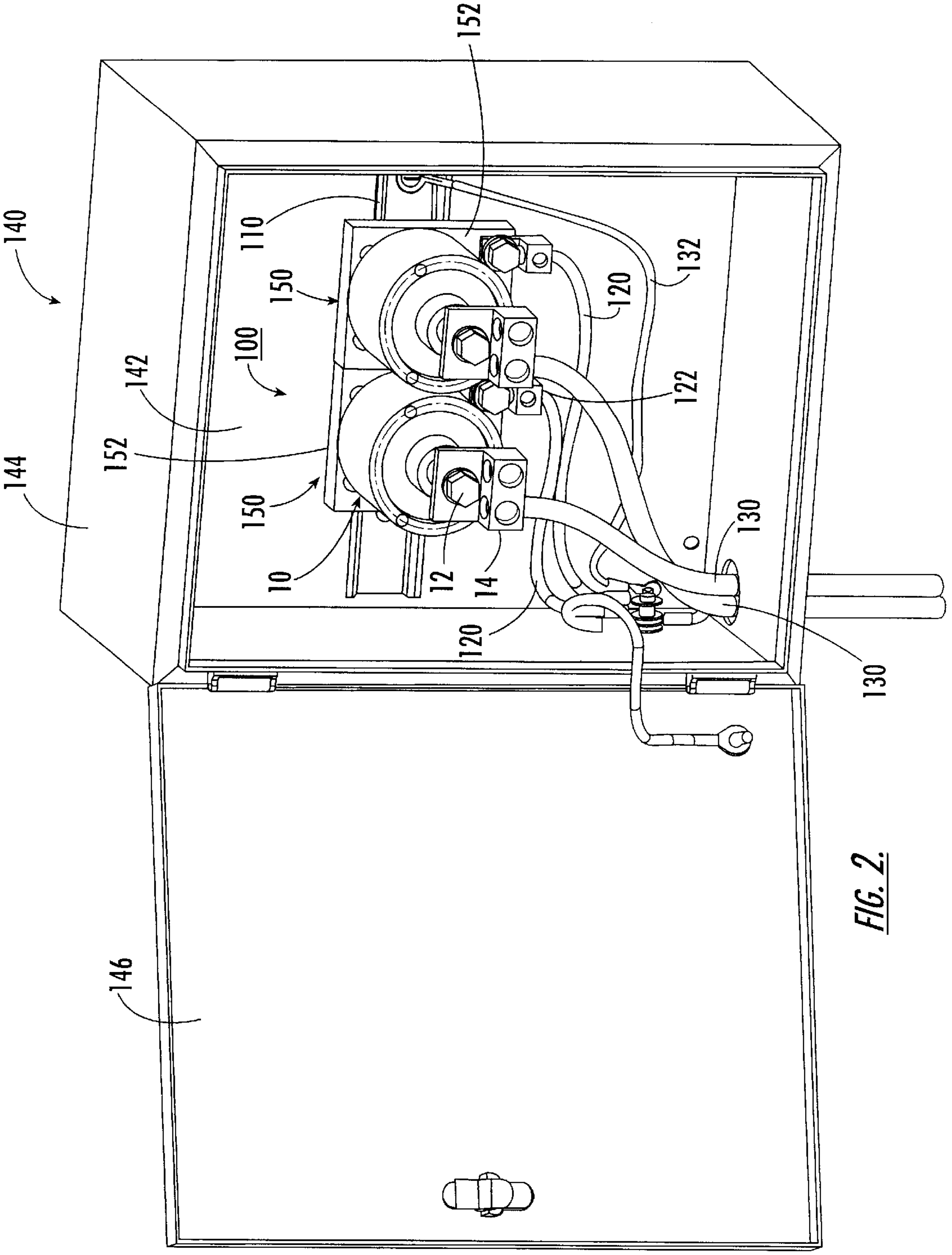
FIG. 2 is a perspective view of an electrical service cabinet and the overvoltage protection assembly of FIG. 1 mounted therein, wherein the overvoltage assembly includes two overvoltage protection modules.
Figure 11:
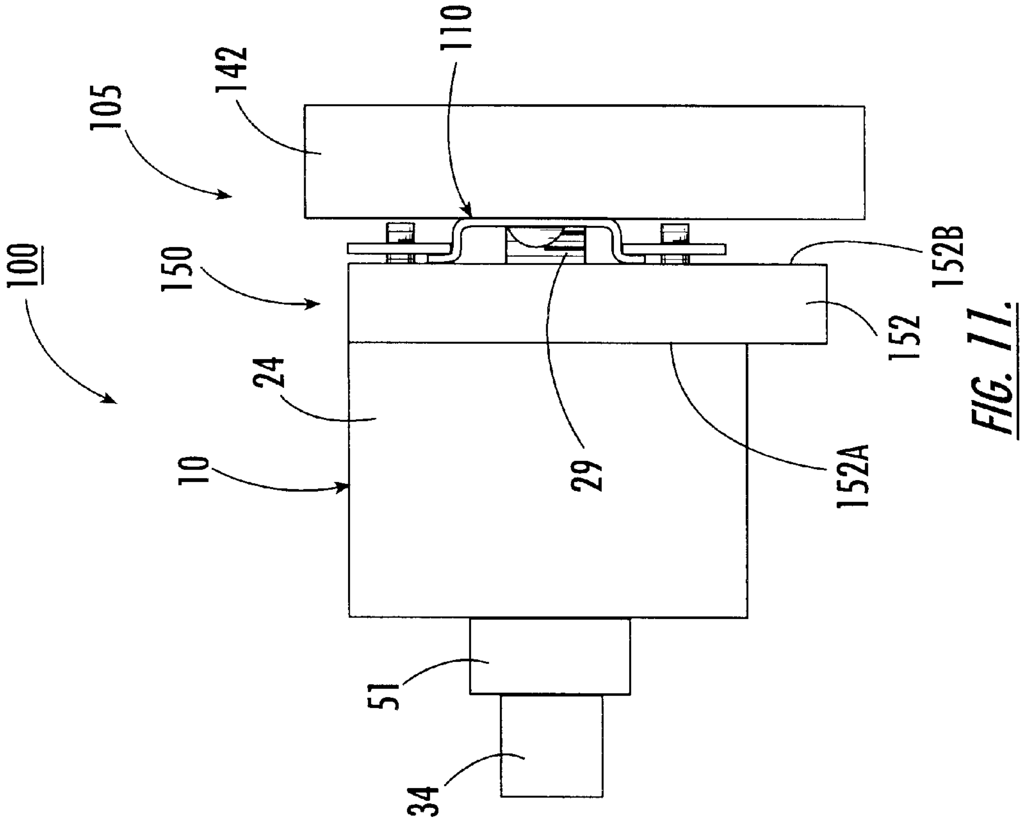
FIG. 11 is a side elevational view of the overvoltage protection assembly of FIG. 1.

With reference to FIGS. 1, 2 and 11, an overvoltage protection assembly 100 according to embodiments of the present invention is shown therein. The overvoltage protection assembly 100 includes an overvoltage protection module 10 and a mount assembly 105. The mount assembly 105 includes an electrically conductive mounting rail 110 and a mount device 150 according to embodiments of the invention. The overvoltage protection assembly 100 is adapted to be secured to a suitable support structure such as a wall, for example, a rear wall 142 of an electrical service utility cabinet 140 (FIG. 2). As discussed in greater detail below, the overvoltage protection assembly 100 may be used to provide a shunt path in the event of an overvoltage condition.

Figure 8:
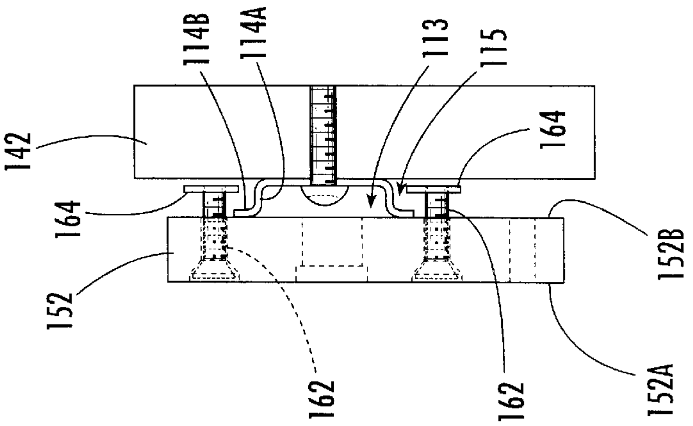
FIG. 8 is a side elevational view of the mount assembly of FIG. 7 wherein the elongated nuts are in the receiving position.

The rail 110 is preferably formed of a strong material such as steel or aluminum. Preferably, the material is electrically conductive. The rail 110 is preferably a DIN rail. That is, the rail 110 is preferably a rail sized and configured to meet DIN specifications for rails for mounting modular electrical equipment. More preferably, the rail 110 is a Type 46277-1, a Type 46277-2, or a Type 46277-3 DIN rail. The rail 110 has a rear wall 112 and integral, lengthwise flanges 114 extending outwardly from the rear wall 112. Each flange 114 includes a forwardly extending wall 114A and an outwardly extending wall 114B. The walls 112, 114 together form a lengthwise extending front, central channel 113 and opposed, lengthwise extending, rear, edge channels 115 (FIGS. 1 and 8). Mounting holes 116 extend fully through the wall 112 and are adapted to receive fasteners 7 (e.g., threaded fasteners or rivets).

Figure 5:
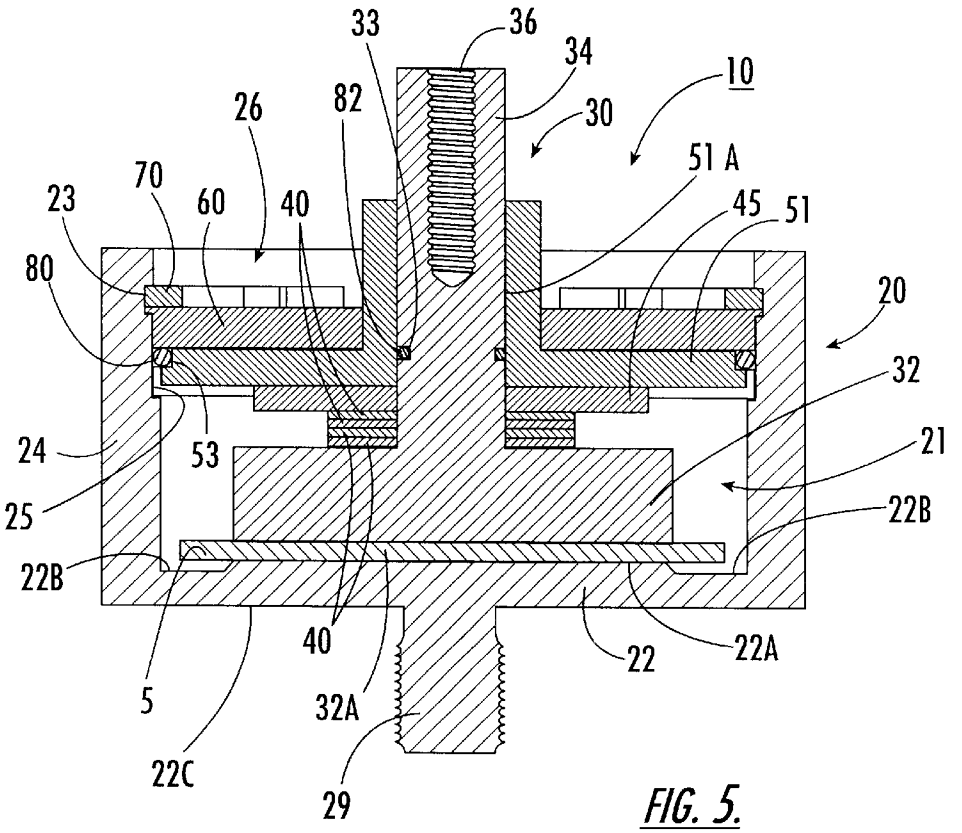
FIG. 5 is a cross-sectional view of an overvoltage protection module forming a part of the overvoltage protection assembly of FIG. 1.
Figure 6:
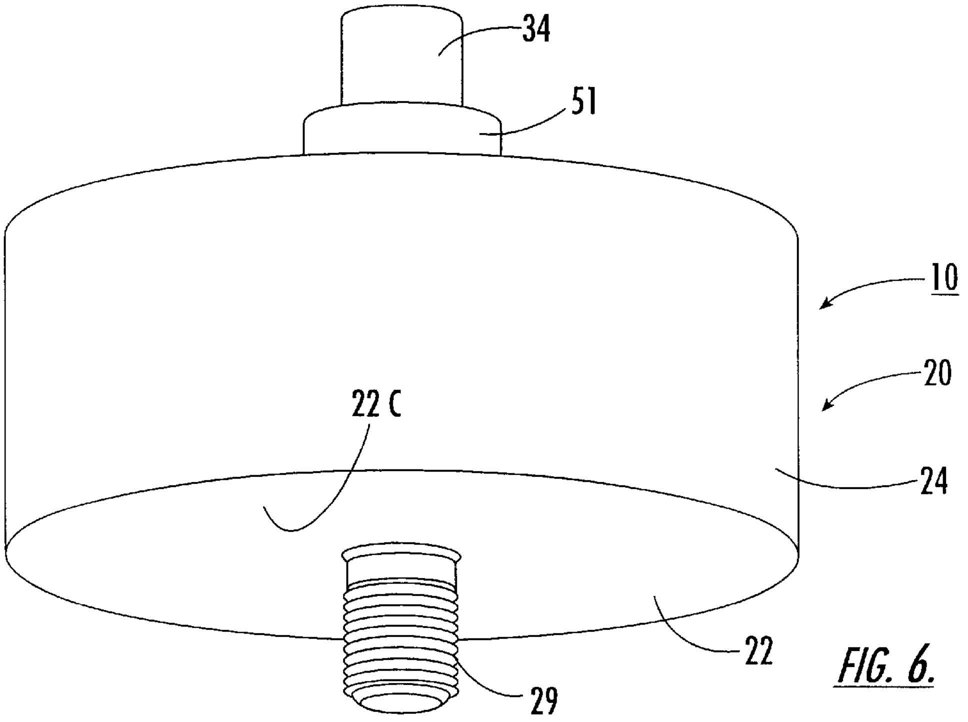
FIG. 6 is a bottom, perspective view of the overvoltage protection module of FIG. 5.

The overvoltage protection module 10 is preferably an overvoltage protection device or module as described in U.S. Pat. No. 6,038,119 to Atkins et al. or in U.S. patent application Ser. No. 09/520,275, filed Mar. 7, 2000, the disclosures of which are hereby incorporated herein by reference in their entireties. The module 10 as illustrated in FIGS. 5 and 6 is exemplary of overvoltage protection modules suitable for use with and in the present invention. Suitable overvoltage protection modules include the Strikesorb™ 40-240 Transient Voltage Surge Suppressor available from Tyco Electronics/Raychem. However, it will be appreciated by those of skill in the art that the module 10 may be modified.

Turning to the overvoltage protection module 10 in more detail and as best seen in FIGS. 5 and 6, the module 10 includes a housing 20 of generally cylindrical shape. The housing has an end wall 22, a cylindrical wall 24 extending from the end wall 22, and a threaded stud 29 extending from the lower surface of the end wall 22. The housing 20 is preferably unitary and axially symmetric as shown. The cylindrical wall 24 and the end wall 22 form a cavity 21 communicating with an opening 26. A piston-shaped electrode 30 is positioned in the cavity 21. The electrode 30 has a head 32 integrally formed with a shaft 34 that projects outwardly through the opening 26. The head 32 has a substantially planar contact surface 32A. A varistor wafer 5, spring washers 40, a flat metal washer 45, an insulator ring 51 and an end cap 60 are also disposed in the cavity 21. The end wall 22 includes a raised platform contact surface 22A surrounded by an annular recessed surface 22B. The varistor wafer 5 is interposed between the contact surfaces 22A and 32A. The head 32 and the end wall 22 are mechanically loaded against the varistor wafer 5 by the spring washers 40 (e.g., Belleville washers) to ensure firm and uniform engagement between the opposed surfaces of the wafer 5 and the surfaces 32A, 22A. A threaded bore 36 is formed in the end of the shaft 34 to receive a bolt 12 (FIG. 1) for securing a bus bar or other electrical connector 14 to the electrode 30. The end wall 22 has an outwardly facing, substantially planar outer surface 22C.

The housing 20 has an internal annular slot 23 formed in the surrounding side wall 24 and extending adjacent the opening 26 thereof. A resilient, truncated ring shaped clip 70 is partly received in the slot 23 and partly extends radially inwardly from the inner wall of the housing 20 to limit outward displacement of the end cap 60. Alternatively, the end cap 60 may threadedly engage the housing or other means may be provided for securing the end cap 60. An annular groove 25 is formed in the interior surface of the side wall 24. The groove 25 communicates with the opening 26 of the housing 20. An annular, peripheral groove 53 is formed in the insulator ring 51. A compressed, resilient O-ring 80 is positioned in the groove 53 such that it is captured between the insulator ring 51, the lower surface of the end cap 60, and the vertical face of the groove 25 of the housing 20. An annular groove 33 is formed in the shaft 34. A compressed, resilient O-ring 82 is positioned in the groove 33 such that it is captured between the groove 33 and an interior surface 51A of the insulator ring 51.

The housing 20, the electrode 30 and the end cap 60 are preferably formed of aluminum. However, any suitable conductive metal may be used. The clip 70 and the spring washers 40 are preferably formed of spring steel.

The varistor wafer 5 is preferably disk-shaped. As used herein, the term "wafer" means a substrate having a thickness which is relatively small compared to its diameter, length or width dimensions. The varistor material may be any suitable material conventionally used for varistors, namely, a material exhibiting a nonlinear resistance characteristic with applied voltage. Preferably, the resistance becomes very low when a prescribed voltage is exceeded. The varistor material may be a doped metal oxide or silicon carbide, for example. Suitable metal oxides include zinc oxide compounds. The varistor material may be coated on each side with a conductive layer.

The combined thermal mass of the housing 20 and the electrode 30 should be substantially greater than the thermal mass of the varistor wafer 5. As used herein, the term "thermal mass" means the product of the specific heat of the material or materials of the object (e.g., the varistor wafer 5) multiplied by the mass or masses of the material or materials of the object. That is, the thermal mass is the quantity of energy required to raise one gram of the material or materials of the object by one degree centigrade times the mass or masses of the material or materials in the object. Preferably, the thermal masses of each of the electrode head 32 and the end wall 22 are substantially greater than the thermal mass of the varistor wafer 5. Preferably, the thermal masses of each of the electrode head 32 and the end wall 22 are at least two times the thermal mass of the varistor wafer 5, and, more preferably, at least ten times as great.

Referring back to FIGS. 1 and 2, the mount device 150 includes a base member 152. The base member 152 has a front surface 152A and a rear surface 152B. Countersunk bores 160 extend fully through the base member 152. Threaded bores 156 and 158 extend (preferably fully) through the base member 152 as well. The bore 156 is adapted to receive and threadedly engage the threaded stud 29 of the overvoltage protection module 10. The bore 158 is adapted to receive and engage a bolt 124 of a ground wire connection as discussed below.

Figure 4:
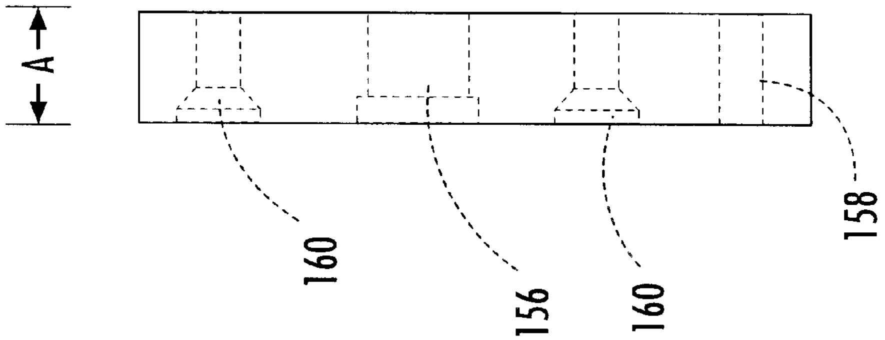
FIG. 4 is a side elevational view of the base member of FIG. 3.
Figure 3:
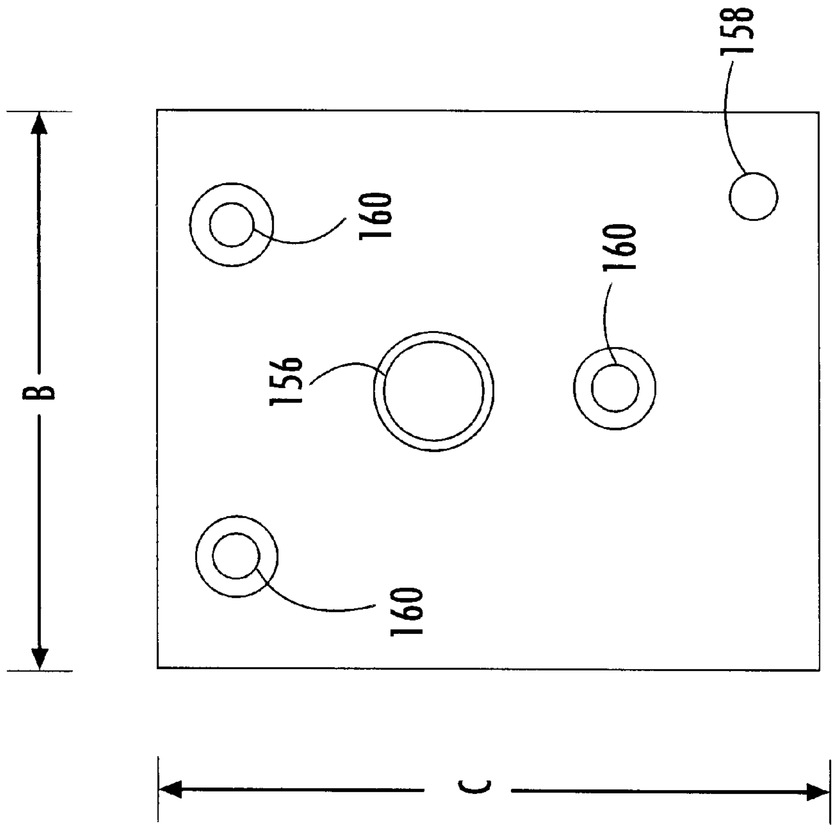
FIG. 3 is a front elevational view of a base member forming a part of the overvoltage protection assembly of FIG. 1.

Preferably, the base member 152 has a thickness A (FIG. 4) of between about 0.375 and 0.625 inch. Preferably, the length B (FIG. 3) of the base member 152 is between about 2.5 and 3 inches. Preferably, the width C (FIG. 3) of the base member 152 is between about 3 and 3.5 inches.

The base member 152 is formed of an electrically and thermally conductive material. Preferably, the material is metal. More preferably, the material is aluminum, steel, brass or copper. Preferably, the base member material has a thermal conductivity of at least 50 W/m° k at 20° C. Preferably, the base member material has a resistivity of no more than $13\times10^{-8}$ ohm-meters at 20° C.

Figure 7:
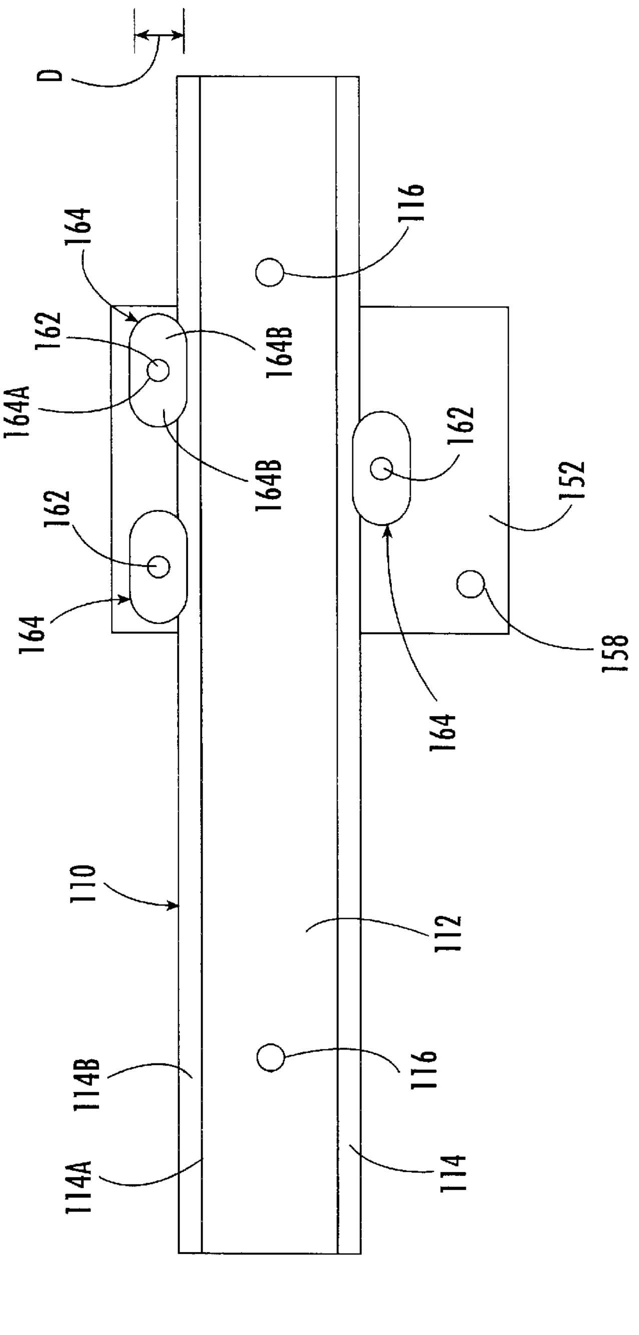
FIG. 7 is a rear elevational view of a mount assembly forming a part of the overvoltage protection assembly of FIG. 1 wherein elongated nuts thereof are disposed in a receiving position.

A threaded member or bolt 162 is disposed in each bore 160 and extends outwardly beyond the rear surface 152B. A nut 164 (FIGS. 1 and 7) is threadedly mounted on each threaded bolt 162. Each nut 164 includes a threaded bore 164A through which the respective threaded bolt 162 extends. Each nut 164 has a pair of opposed, radially outwardly extending lobes 164B. The threaded bolts 162 and the nuts 164 are preferably formed of steel. With reference to FIG. 7, each nut 164 preferably has a length E that is between about 1.5 and 3 times its width D.

The construction of the overvoltage protection assembly 100 may be more fully appreciated upon review of the following description of preferred methods for assembling and mounting the overvoltage protection assembly 100 on a support structure 142. As shown in FIG. 2, the support structure 142 may be a rear wall of a cabinet 140, which may also include side walls 144 and a door 146. The support structure 142 (and the remainder of the cabinet 140) may be formed of metal, plastic or any other suitable material. The rail 110 is mounted on the support structure 142 by inserting the fasteners 7 through the holes 116 and engaging the fasteners 7 with the support structure 142. Preferably, the rail 110 is mounted such that it extends lengthwise horizontally.

Figure 10:
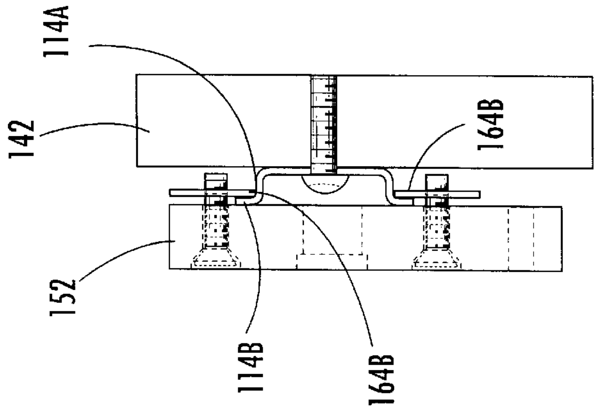
FIG. 10 is a side elevational view of the mount assembly of FIG. 7 wherein the elongated nuts thereof are in the securing position.
Figure 9:
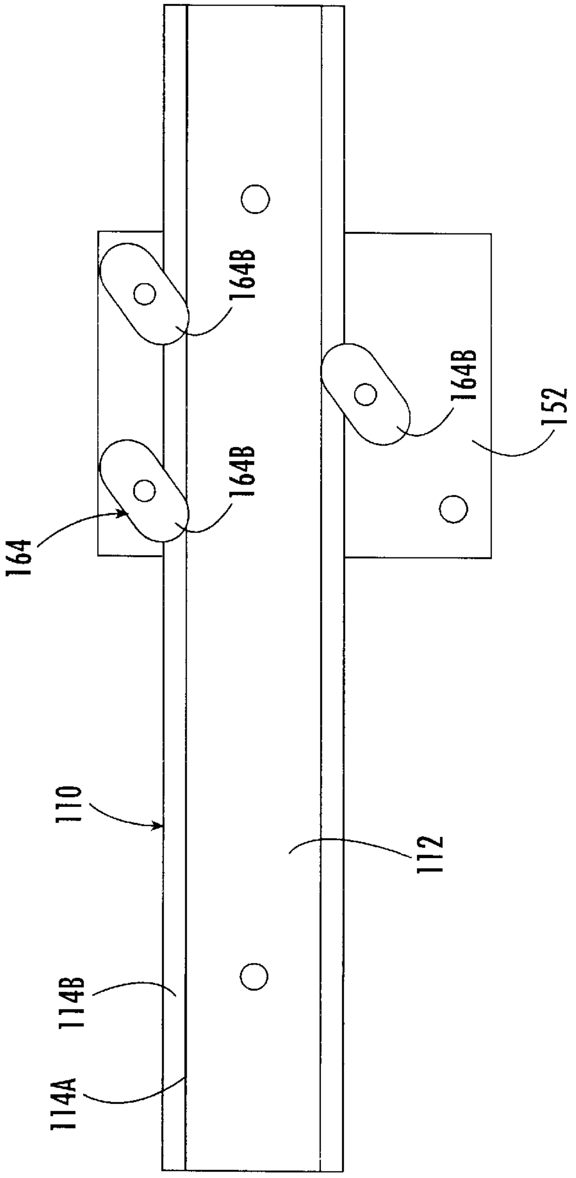
FIG. 9 is a rear elevational view of the mount assembly of FIG. 7 wherein the elongated nuts thereof are in a securing position.

The threaded bolts 162 are inserted through the holes 160, and the elongated nuts 164 are mounted thereon such that the nuts 164 are spaced apart from the rear surface 152B as shown in FIG. 8. The elongated nuts 164 are oriented in a receiving position such that the lobes 164B extend substantially horizontally as shown in FIG. 7. The mount device 150 is placed over the rail 110 as shown in FIGS. 7 and 8 such that the rear surface 152B and the elongated nuts 164 are disposed on opposite sides of the flanges 114. The threaded bolts 162 are then rotated (typically, clockwise) such that the elongated nuts 164 are translated toward the rear surface 152B. As each threaded bolt 162 is rotated, the associated, unfixed elongated nut 164 also rotates with the threaded bolt 162 until one of the lobes 164B abuts the adjacent wall 114A of the respective flange 114 as shown in FIGS. 9 and 10. As rotation of the threaded bolts 162 continues, the nuts 164 tighten into a securing position onto the walls 114B of the flanges 114 until the walls 114B are securely frictionally captured between the abutting lobes 164B and the rear surface 152B as shown in FIGS. 9 and 10.

The overvoltage protection module 10 is mounted on the base member 152, preferably after the base member 152 is mounted on the rail 110, by screwing the threaded stud 29 into the threaded bore 156. The overvoltage protection module 10 is preferably screwed in until the rear surface 22B securely abuts the front surface 152A so as to frictionally secure the overvoltage protection module 10 in place. Preferably, the front surface 152A is sized such that it is at least coextensive with the rear surface 22B.

The desired AC or DC current service line 130 (FIG. 2) may be connected to the electrode member 30 (FIG. 5) by means of the bolt 12 and the connector 14. A ground line 120 is secured to the mount device 150 by means of a lug 122 and the bolt 124 (FIG. 1). Preferably, the rail 110 is also connected to ground by a ground wire 132.

In the foregoing manner, the device 100 may be connected directly across an AC or DC input, for example, in an electrical service utility box. By connecting the service line 130 directly or indirectly to the electrode shaft 34, an electrical flow path is provided through the electrode 30, the varistor wafer 5, the housing end wall 22 and the base member 152 to the ground line 120. In the absence of an overvoltage condition, the varistor wafer 5 provides a high resistance such that no current flows through the module 10 and it appears electrically as an open circuit. In the event of an overvoltage condition (relative to the design voltage of the module 10), the resistance of the varistor wafer decreases rapidly, allowing current to flow through the module 10 and create a shunt path for current flow to protect other components of an associated electrical system. The general use and application of overvoltage protectors such as varistors is well known to those of skill in the art and, accordingly, will not be further detailed herein.

The overvoltage protection assembly 100 provides a number of advantages for safely, durably and consistently handling extreme and repeated overvoltage conditions. The base member 152 provides a thermal conduction path from the module 10 that serves to improve the dissipation of heat energy generated by current passing through the varistor wafer 5. The relatively large thermal mass of the base member 152 serves to absorb (via thermal conduction through the end wall 22) a relatively large amount of heat from the varistor wafer 5, thereby reducing heat induced destruction or degradation of the varistor wafer 5 as well as reducing any tendency for the varistor wafer 5 to produce sparks or flame. The base member 152 further conducts the heat to the rail 110 which may provide a substantial cooling area and may in turn conduct heat to the support structure 142, allowing further heat dissipation. The relatively large thermal mass and the substantial contact areas between the housing end wall 22 and the base member front surface 152A provide a more uniform temperature distribution in the end wall 22, and thus a more uniform temperature distribution in the varistor wafer 5, thereby minimizing hot spots and resultant localized depletion of the varistor material.

The overvoltage protection assembly 100 may include multiple overvoltage protection modules 10 and mount devices 150. For example, as shown in FIG. 2, two overvoltage protection modules 10 are mounted in a common cabinet 140 on a common rail 110. Each base member is mounted on the rail 110 in the manner described above in side-by-side relation. Preferably, a respective ground wire 120 is connected to each base member 152 by a lug 122. Alternatively, a ground wire 120 may be connected to a first one of the base members 152 and the second base member 152 is connected to the ground wire 120 by an optimal supplemental ground wire or connector 126 engaging the threaded bore 158 of the second base member 152. Each overvoltage protection module 10 is mounted on a respective one of the base members 152 and has a respective service line 130 connected to the electrode 30 thereof.

Figure 12:
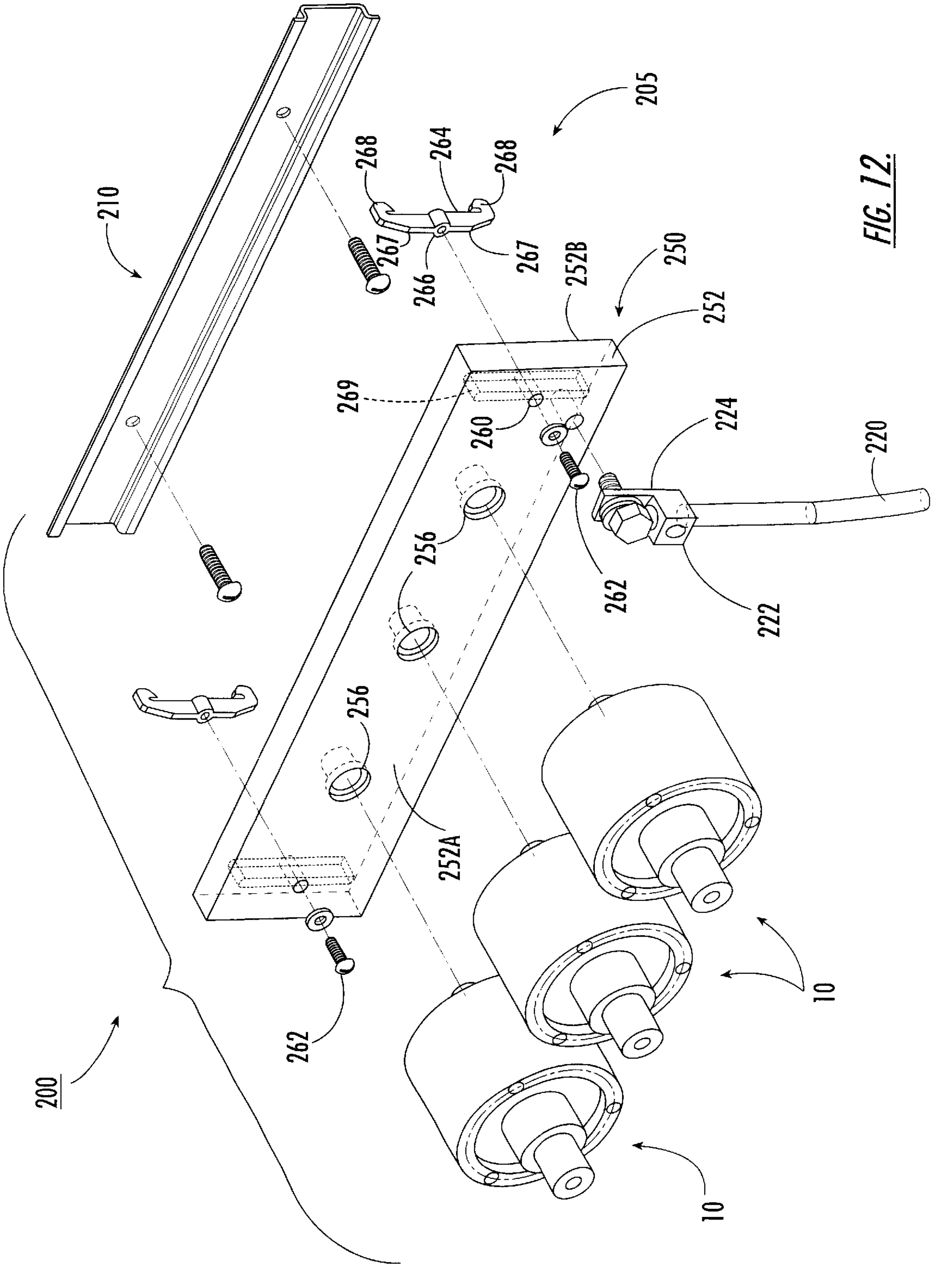
FIG. 12 is an exploded, perspective view of an overvoltage protection assembly according to further embodiments of the present invention.
Figure 13:
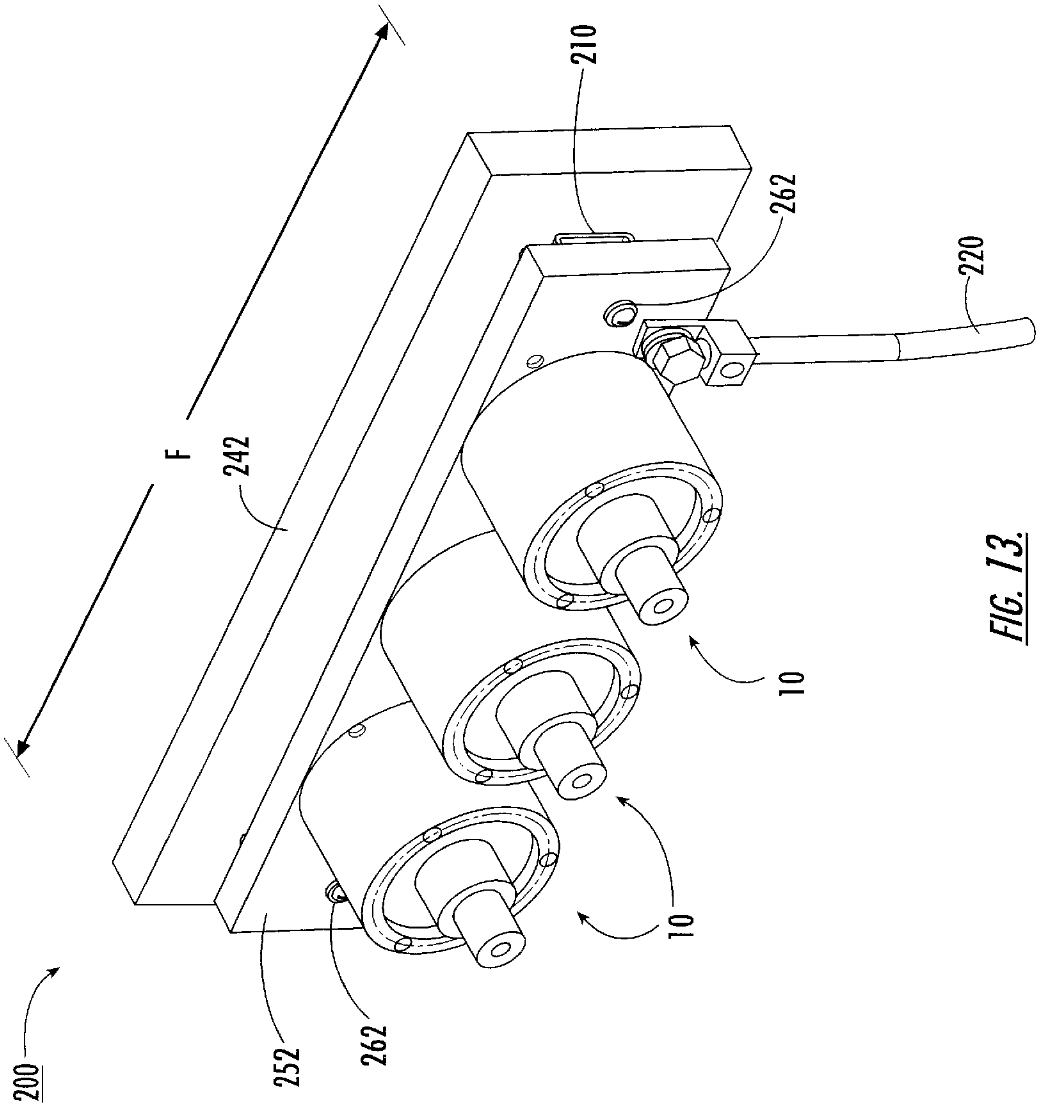
FIG. 13 is a perspective view of the overvoltage protection assembly of FIG. 12.
Figure 14:
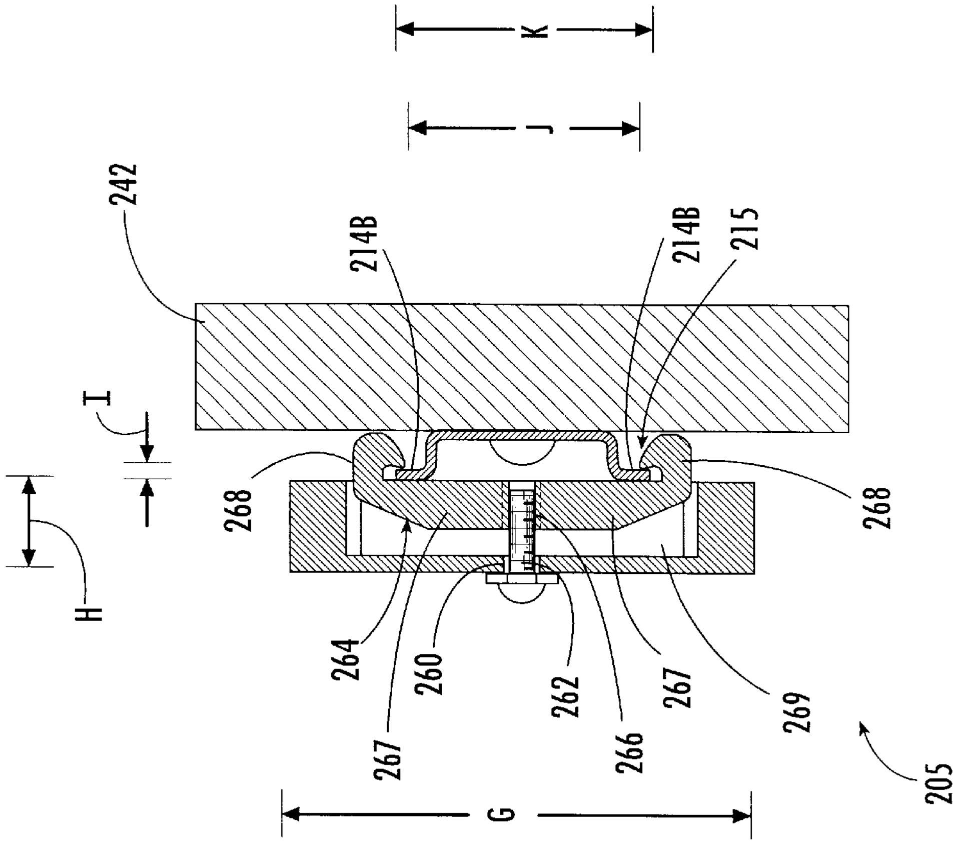
FIG. 14 is a side, cross-sectional view of a mount assembly forming a part of the overvoltage protection assembly of FIG. 12.

With reference to FIGS. 12–14, an overvoltage protection assembly 200 according to further embodiments of the present invention is shown therein. The overvoltage protection assembly 200 includes a plurality of the overvoltage protection modules 10 and a mounting assembly 205 (also shown in FIG. 15). The mounting assembly 205 includes a rail 210 and a mount device 250. The rail 210 preferably corresponds to the rail 110 and is adapted to be mounted on a support 242 (for example, corresponding to the support 142).

The mount device 250 includes a unitary base member 252 having a front surface 252A and an opposing rear surface 252B. The base member 252 is preferably formed of the same material as described above with regard to the base member 152. A plurality of threaded bores 256 extend through the base member 252. A pair of holes 260 also extend through the base member 252 and each communicate with a respective one of a pair of widthwise slots or channels 269. The channels 269 open to the rear surface 252B. A cross member 254 is disposed in each of the channels 269. A threaded member or bolt 262 extends through each hole 260 and threadedly engages a threaded bore 266 of a respective one of the cross members 264. Each cross member 264 has opposed arms 267 extending from the threaded bore 266. Each arm 267 has a hook structure 268 on the outer end thereof and extending beyond the rear surface 252B.

The distance J between the inner tips of the hook structures 268 is selected such that it is less than the corresponding width K of the rail 210. However, the depth I of the hook structures 268 is selected such that each of the cross members 264 can be pivoted to position the hook structures 268 about the flange wall 214B. The inner diameters of the holes 260 are sized to allow the threaded bolts 262 to pivot upwardly and downwardly. The inner profiles of the hook structures 268 may also be configured to facilitate positioning of the cross member 264 on the flanges 214.

To mount the mount device 250 on the rail 210, the threaded bolts 262 are rotated counterclockwise so that the cross members 264 are extended partially or fully out of the channels 269. The cross members 264 are then pivoted, and the hook structures 268 are inserted over the flange walls 214B of the rail 210 and are received in the channels 215. The threaded bolts 262 are then rotated clockwise to pull the cross members 264 into the channels 269. In this manner, the rail 210 is pulled into abutment with the rear surface 252B and the cross members 264 are restricted from further pivoting. The flange walls 214A are thereby captured between the hook structures 268 and the rear surface 252B. Each overvoltage protection module 10 can be mounted on the base member 252 by threadedly engaging the threaded stud thereof with a respective one of the threaded bores 256. The mount device 250 may be grounded by joining the ground wire 220 to the base member 252 using the lug 222 and the bolt 224.

The length F (FIG. 13) of the base member 252 is preferably between about 3.5 and 9 inches. The width G (FIG. 14) of the base member 252 is preferably between about 2 and 3 inches. The thickness H of the base member 252 is preferably between about 0.375 and 0.625 inch. The depth I of the hook structures 268 is preferably between about 0.050 and 0.060. The distance J between the hook structures 268 is preferably between about 0.075 and 0.125 inch less than the width K of the rail 210.

It will be appreciated by those of skill in the art that various of the features described above may be used with each of the overvoltage protection assemblies 100, 200. For example, the base member 152 may be extended to accommodate multiple overvoltage protection modules 10 in the same manner as the base member 252. Similarly, the holes 160, threaded bolts 162 and elongated nuts 164 may be replaced with the holes 260, threaded bolts 262 and cross members 264. The mounting assemblies 105, 205 may be adapted to mount overvoltage protection modules of other designs, or other overvoltage protection modules may be mounted on the base members 152, 252 as described. For example, the overvoltage protection module may have a sidewardly extending mounting tab through which a threaded bolt may be inserted to engage the threaded bore 156 or one of the threaded bores 256.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An overvoltage protection assembly, said assembly comprising:

a) a rail;

b) a mount device including:

a base member having front and rear opposed surfaces; and a mounting structure on said rear surface, said mounting structure securing said base member to said rail; and c) an overvoltage protection module mounted on said front surface of said base member;

d) wherein said rail is a DIN rail.

2. The assembly of claim 1 wherein said rail is at least one of a Type 46277-1 DIN rail, a Type 46277-2 DIN rail and a Type 46277-3 DIN rail.

3. The assembly of claim 1 wherein said rail is formed of an electrically conductive material.

4. The assembly of claim 1 wherein said base member is formed of metal.

5. The assembly of claim 1 wherein said metal is selected from the group consisting of aluminum, steel, brass and copper.

6. The assembly of claim 1 wherein said base member is formed of a material having a thermal conductivity of at least 50 W/m°k at 20° C.

7. The assembly of claim 6 wherein said base member is formed of a material having a resistivity of no more than $13\times10^{-8}$ ohm-meters at 20° C.

8. An overvoltage protection assembly, said assembly comprising:

a) a rail;

b) a mount device including:

a base member having front and rear opposed surfaces; and a mounting structure on said rear surface, said mounting structure securing said base member to said rail; and c) an overvoltage protection module mounted on said front surface of said base member;

d) wherein:

said mounting structure includes at least one threaded member extending through said base member and at least one elongated nut mounted on said threaded member and disposed adjacent said rear surface of said base member; and a flange portion of said rail is captured between said elongated nut and said rear surface of said base member.

9. The assembly of claim 8 including a plurality of said threaded members and a plurality of said elongated nuts each mounted on a respective one of said threaded members.

10. An overvoltage protection assembly, said assembly comprising:

a) a rail;

b) a mount device including:

a base member having front and rear opposed surfaces; and a mounting structure on said rear surface, said mounting structure securing said base member to said rail; and c) an overvoltage protection module mounted on said front surface of said base member;

d) wherein:

said mounting structure includes a threaded member extending through said base member and a cross member mounted on said threaded member, said cross member having first and second opposed ends and first and second hook structures on said first and second ends, respectively;

a first flange portion of said rail is captured between said first hook structure and said rear surface of said base member; and a second flange portion of said rail is captured between said second hook structure and said rear surface of said base member.

11. The assembly of claim 10 including a channel formed in said rear surface of said base member, wherein at least a portion of said cross member is disposed in said channel.

12. An overvoltage protection assembly, said assembly comprising:

a) a rail;

b) a mount device including:

a base member having front and rear opposed surfaces, said base member being secured to said rail; and a mounting structure on said rear surface, said mounting structure securing said base member to said rail; and c) an overvoltage protection module mounted on said front surface of a respective one of said base members;

d) wherein said assembly includes a plurality of said mount devices each including a base member secured to said rail and a plurality of said overvoltage protection modules each mounted on a respective one of said base members.

13. The assembly of claim 12 including a ground connector electrically connecting a first one of said base members to a second one of said base members.

14. An overvoltage protection assembly, said assembly comprising:

a) a rail;

b) a mount device including:

a base member having front and rear opposed surfaces;

a mounting structure on said rear surface, said mounting structure securing said base member to said rail; and a threaded bore formed in said base member; and c) an overvoltage protection module mounted on said front surface of said base member, said overvoltage protection module including a metal housing and a threaded stud extending from said housing and engaging said threaded bore to thereby secure said overvoltage protection module to said base member.

15. The assembly of claim 1 including a plurality of said overvoltage protection modules mounted on said base member.

16. An overvoltage protection assembly, said assembly comprising:

a) a rail;

b) a mount device including:

a base member having front and rear opposed surfaces;

a mounting structure on said rear surface, said mounting structure securing said base member to said rail; and a plurality of threaded bores formed in said base member; and c)a plurality of overvoltage protection modules mounted on said front surface of said base member; wherein each of said overvoltage protection modules includes a threaded stud engaging a respective one of said threaded bores.

17. An overvoltage protection assembly, said assembly comprising:

a) a rail;

b) a mount device including:

a base member having front and rear opposed surfaces; and a mounting structure on said rear surface, said mounting structure securing said base member to said rail; and c) an overvoltage protection module mounted on said front surface of said base member; wherein said overvoltage protection module comprises:

an electrically and thermally conductive end wall having front and rear surfaces, said rear surface of said end wall engaging said front surface of said base member; and an electrically conductive electrode member disposed adjacent said front surface of said end wall.

18. The assembly of claim 17 further including a wafer formed of varistor material, said wafer positioned between and engaging each of said front surface of said end wall and said electrode member.

19. A mount device for mounting an overvoltage protection module on a rail, said mount device comprising:

a) a base member having front and rear opposed surfaces; and b) a mounting structure on said rear surface, said mounting structure adapted to secure said base member to the rail;

c) a threaded bore formed in said base member and adapted to engage a threaded stud of the overvoltage protection module d) wherein said base member is adapted to securely engage the overvoltage protection module; and e) wherein said base member is formed of metal.

20. The device of claim 19 wherein said metal is selected from the group consisting of aluminum, steel, brass and copper.

21. The device of claim 19 wherein said base member is formed of a material having a thermal conductivity of at least 50 W/m°k at 20° C.

22. The device of claim 21 wherein said base member is formed of a material having a resistivity of no more than $13\times10^{-8}$ ohm-meters at 20° C.

23. A mount device for mounting an overvoltage protection module on a rail, said mount device comprising:

a) a base member having front and rear opposed surfaces; and b) a mounting structure on said rear surface, said mounting structure adapted to secure said base member to the rail;

c) wherein said base member is adapted to securely engage the overvoltage protection module; and d) wherein said base member is formed of metal;

e) wherein:

said mounting structure includes at least one threaded member extending through said base member and at least one elongated nut mounted on said threaded member and disposed adjacent said rear surface of said base member; and said mounting structure is adapted to capture a flange portion of the rail between said elongated nut and said rear surface of said base member.

24. The device of claim 23 including a plurality of said threaded members and a plurality of said elongated nuts each mounted on a respective one of said threaded members.

25. A mount device for mounting an overvoltage protection module on a rail, said mount device comprising:

a) a base member having front and rear opposed surfaces; and b) a mounting structure on said rear surface, said mounting structure adapted to secure said base member to the rail;

c) wherein said base member is adapted to securely engage the overvoltage protection module; and d) wherein said base member is formed of metal;

e) wherein:

said mounting structure includes a threaded member extending through said base member and a cross member mounted on said threaded member, said cross member having first and second opposed ends and first and second hook structures on said first and second ends, respectively;

said mounting structure is adapted to capture a first flange portion of the rail between said first hook structure and said rear surface of said base member; and said mounting structure is adapted to capture a second flange portion of the rail between said second hook structure and said rear surface of said base member.

26. The device of claim 25 including a channel formed in said rear surface of said base member, wherein at least a portion of said cross member is disposed in said channel.

27. A mount device for mounting an overvoltage protection module on a rail, said mount device comprising:

a) a base member having front and rear opposed surfaces; and b) a mounting structure on said rear surface, said mounting structure adapted to secure said base member to the rail;

c) wherein said base member is adapted to securely engage the overvoltage protection module; and d) wherein said base member is formed of metal;

e) wherein said base member is adapted to hold a plurality of overvoltage protection modules and said device includes a plurality of threaded bores formed in said base member, wherein each of said threaded bores is adapted to hold a threaded stud of an overvoltage protection module.

28. A mount assembly for mounting an overvoltage protection module on a support, said mount assembly comprising:

a) a rail;

b) a mount device including:

a base member having front and rear opposed surfaces; and a mounting structure on said rear surface, said mounting structure securing said base member to said rail;

c) wherein said base member is adapted to securely engage the overvoltage protection module; and d) wherein said base member is formed of metal;

e) wherein said rail is a DIN rail.

29. The assembly of claim 28 wherein said rail is at least one of a Type 46277-1 DIN rail, a Type 46277-2 DIN rail and a Type 46277-3 DIN rail.

30. The assembly of claim 28 wherein said rail is formed of an electrically conductive material.

31. A method of mounting an overvoltage protection module on a rail, said method comprising:

a) providing a mount device including:
a base member having front and rear opposed surfaces; and a mounting structure on the rear surface;

b) securing the base member to the rail using the mounting structure; and c) mounting an overvoltage protection module on the front surface of the base member;

d) wherein:
the mounting structure includes at least one threaded member extending through the base member and at least one elongated nut mounted on the threaded member and disposed adjacent the rear surface of the base member; and
said step of securing the base member to the rail includes capturing a flange portion of the rail between the elongated nut and the rear surface of the base member.

32. A method of mounting an overvoltage protection module on a rail, said method comprising:

a) providing a mount device including:
a base member having front and rear opposed surfaces; and a mounting structure on the rear surface;

b) securing the base member to the rail using the mounting structure; and c) mounting an overvoltage protection module on the front surface of the base member;

d) wherein:
the mounting structure includes a threaded member extending through the base member and a cross member mounted on the threaded member, the cross member having first and second opposed ends and first and second hook structures on the first and second ends, respectively; and
said step of securing the base member to the rail includes capturing a first flange portion of the rail between the first hook structure and the rear surface of the base member and capturing a second flange portion of the rail between the second hook structure and the rear surface of the base member.

33. A method of mounting an overvoltage protection module on a rail, said method comprising:

a) providing a mount device including:
a base member having front and rear opposed surfaces; and
a mounting structure on the rear surface;

b) securing the base member to the rail using the mounting structure; and c) mounting an overvoltage protection module on the front surface of the base member;

d) wherein the overvoltage protection module comprises:
an electrically and thermally conductive end wall having front and rear surfaces, the rear surface of the end wall engaging the front surface of the base member; and
an electrically conductive electrode member disposed adjacent the front surface of the end wall.

34. The method of claim 33 wherein the overvoltage protection module further includes a wafer formed of varistor material, the wafer positioned between and engaging each of the front surface of the end wall and the electrode member.

* * * * *